United States Patent Office 3,681,273
Patented Aug. 1, 1972

3,681,273
NONBURNING, INTUMESCENT FLEXIBLE POLYURETHANE FOAM
David John Kelly, Aston Township, Delaware County, Pa., assignor to Scott Paper Company, Delaware County, Pa.
No Drawing. Filed Oct. 14, 1969, Ser. No. 871,813
Int. Cl. C08g 22/44
U.S. Cl. 260—2.5 AJ                8 Claims

ABSTRACT OF THE DISCLOSURE

A nonburning imparting amount of a mixture of (a) a nitrogen and phosphorous-containing compound, and (b) a nitrogen-containing polyol is incorporated in a foamable polyurethane-forming reaction mixture to produce a flame-retardant, intumescent and non-burning flexible polyurethane foam which would otherwise be consumed by exposure to a flame.

BACKGROUND OF THE INVENTION

This invention relates to novel flexible polyurethane compositions and foams that are flame-retardant, intumescent and nonburning, and to a process for producing the same. More particularly, this invention is concerned with flexible polyurethane foams derived from polyurethane compositions comprising as a modifying ingredient contained therein a mixture of (a) a nitrogen and phosphorus-containing compound, such as an ammonium polyphosphate, and (b) a nitrogen-containing polyol, such as an N-alkylol substituted polyalkylene polyamine. To date, there is no commercially acceptable non-burning flexible polyurethane foam.

Polyurethanes are polymers containing repeated >NC(O)OR— urethane linkages. These polymers are made by reacting a polyisocyanate with a compound having a plurality of active hydrogens. By compound having active hydrogen is meant a compound that gives a positive Zerewitinoff test. Polyurethane resins can be made into foams having excellent strength, durability, low density, light color, uniform cell size and good heat-insulating properties, and can be used for many diverse purposes, such as carpet underlay and lining for garments.

Unfortunately, polyurethane foams burn readily when ignited, that is, they support combustion thus making them unsuitable for certain uses in which fire is a hazard. Accordingly, it is desirable to make polyurethane resin foams which are nonburning or at least self-extinguishing, and if possible, intumescent, so as to eliminate or minimize the hazard of fire. By "nonburning" it is meant that there is no evidence of ignition, such as flame or progressive glow after removal of an open flame. by "self-extinguishing" it is meant that the material is incapable of burning or sustaining a flame for more than a short time after it is separated from an open flame in which it has been heated and ignited. By "intumescent" it is meant that the material swells and chars when exposed to flame and forms an insulating fire-retardant barrier between the flame and the unexposed portions of the foam.

Generally, the prior art methods for producing a flame-retardant polyurethane foam have been more successful in rigid foam systems, not flexible foams. The prior art methods can be classified generally into three areas, viz (1) incorporating nonreactive additives into the foamable reactants, (2) coating the foam with flame-retarding materials, and (3) incorporating flame-retarding compounds containing functional groups which become chemically bound in the polymer chain.

No general pattern of burning properties can be predicted for a foamable polyurethane composition containing a mixture of flame-retarding and/or intumescence-producing agents. It is usually impossible to predict whether there will be composite flame-retardant and/or intumescent activity produced by a mixture of two or more flame-retarding, self-extinguishing and/or intumescence-producing agents based on their individual characteristics. It is possible that when flame-inhibiting compounds are combined, the resulting mixture may be even less effective than the individual components when used separately because one compound may have an antagonistic effect on the other compound which will reduce its flame-inhibiting activity. Generally, the activity of the mixture is no better than additive. It would be unexpected for the resultant mixture, in addition to controlling flammability of the polyurethane foam, to provide a flame-resistant intumescent char which controls burning better than the additive control of the individual active components in the composition.

SUMMARY OF THE INVENTION

In accordance with this invention a nonburning imparting amount of a mixture of (a) a nitrogen and phosphorus-containing compound, and (b) a nitrogen-containing polyol is incorporated in a foamable polyester-polyol based polyurethane reaction mixture to produce a flame-retardant, intumescent and nonburning flexible polyurethane foam. Components (a) and (b) will be defined more fully hereinbelow. Nonburning flexible polyurethane foams are obtained in the practice of this invention when at least 10 parts per hundred (phr.) of the total mixture of (a) and (b), based on 100 parts by weight of polyester polyol, are incorporated into the foamable polyurethane reaction mixture. The ratio of (a) to (b) is at least 1:1, the preferred ratio is from about 3:1 to about 6:1. The ratio of (a) to (b) will vary with the particular composition of the foamable reaction mixture.

The mixture of components (a) and (b) represents a synergistic combination, so that when a given total amount of the mixture is uniformly dispersed throughout the foamable reaction mixture it imparts greater flame-retardant, intumescent and non-burning properties to foamed urethane polymers than does the same amount of either component (a) or (b) used alone. In situations in which a quantity of either (a) or (b) used alone produces some flame-retarding effects on urethane polymers, a lesser quantity of the synergistic combination of (a) and (b) will produce at least the same or a higher degree of flame-retarding properties.

When component (a) is used alone as an additive in the same foamable reaction mixture, the burnthrough time is increased slightly, but the foam usually continues to burn and supports a flame even after it is separated from the open flame. When component (b) is used alone as an additive in a foamable polyurethane reaction mixture, the resulting foam behaves almost the same as an untreated foam in burnthrough tests. For example, a two-inch thick polyurethane foam test sample will burn through in less than one-half minute when contacted with an open high pressure flame of about 1500° F. It was therefore surprising to find that a mixture of (a) and (b) as a modifying ingredient in a foamable reaction mixture produced a foam product that was non-burning, intumescent and required about six minutes direct contact with an open high pressure flame before burnthrough on a two-inch test sample without the production of flaming or melting droplets. The particular test method is described hereinbelow.

A significant advantage in the foams produced in the present invention is that they will reduce the constantly increasing loss of life and property from fire because they swell or intumesce and char when exposed to flame and form an insulating fire-retardant barrier between the flame and the unexposed portions of the foam. The char or crust formed on the foam after exposure to heat provides a high resistance to heat flow between the heat source and the structure. A char has low thermal conductivity and high oxidation resistance so that it not only affords protection by virtue of its low thermal conductivity, but its surface reaches a high temperature and thus re-radiates a large fracction of the incident heat load. The novel polyurethane foams of this invention are characterized by a multiplicity of protective mechanisms, such as self-extinguishing properties, intumescent properties, and charring properties which respond to provide protection when exposed to a fire. In addition, a novel foam of this invention inhibits the formation of hot or flaming droplets which can cause excessive damage even though the flame has been extinguished or inhibited.

Representative of component (a) of this invention are monoammonium phosphate, diammonium phosphate, ammonium polyphosphates, melamine phosphate, guanylurea phosphate and urea phosphate. Among the ammonium polyphosphates represented by component (a) suitable for use in the synergistic combination of this invention are compounds having the general formula:

where $n$ is an integer having an average value greater than 10 and $m/n$ is between about 0.7 and about 1.1 and the maximum value of $m$ is equal to $n+2$. The ammonium polyphosphates can be prepared by thermally condensing a phosphate-containing material such as monoammonium orthophosphate, diammonium orthophosphate, condensed phosphoric acid, orthophosphoric acid, and the like with an ammoniating and condensing agent, such as urea, ammonium carbonate, biuret, sulfamide, sulfamic acid, ammonium sulfamate, guanyl urea, 1,3-diamino urea, biurea, and the like. In particular, for example, monoammonium orthophosphate and urea can be thermally condensed to prepare substantially water-insoluble ammonium polyphosphates by heat treating a melt formed from substantially equimolar quantities at a temperature of about 250° C. for a period of about 3 hours.

Component (b), the nitrogen-containing polyol, is of the formula (I)

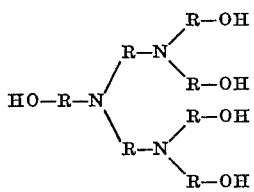

where R is an alkylene group selected from ethylene, propylene, isopropylene, and the like. The preferred nitrogen-containing polyol is an N-alkylol substituted polyalkylene polyamine of the formula (II)

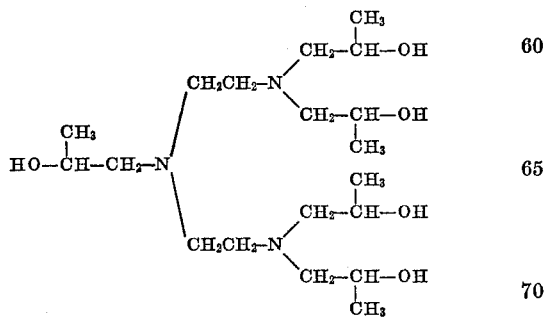

In the present invention, the novel synergistic combination of (a) and (b) is combined with a polyol, an organic polyisocyanate, a suitable catalyst, a foaming agent, and if desired a surfactant, to produce the non-burning, intumescent polyurethane foams of this invention. Various other additives may be incorporated in the polymer along with the presently disclosed synergists, such as fillers, pigments, dyes, plasticizers and stabilizers.

The synergistic combination of (a) and (b) may be admixed with any one or more of the several components of the reactant composition involved in the making of the polyurethane material. All of the components, including the synergistic combination, may be mixed and the reactant components polymerized in one place, or the synergistic combination may be mixed with one or more of them, i.e., with the polyol, before mixture with the remaining components. The synergistic combination may be combined with the polyol and/or the polyisocyanate, or catalyst reactants in any of several ways. Each of the polyol, polyisocyanate, catalyst and synergistic materials may be metered and pumped and/or charged into a common mixing vessel, and then the resulting mixture may easily be moved to the polymerization site for use in molds, slab stock operations, etc. The synergistic combination may also be admixed with the polyol reactant before it is combined with the polyisocyanate reactant. It is also within the scope of the invention to mix the synergistic combination with the polyisocyanate before combining such mixture with the polyol reactant. However, if a catalyst, such as a tertiary amine, and the synergistic combination are mixed and allowed to stand at room temperature for substantial periods of time, reaction may occur. Hence, it is preferred to mix the polyol, polyisocyanate and/or catalyst and the synergistic components either simultaneously, or to first mix the polyol and/or polyisocyanate with the synergistic combination and then combine this mixture with the catalyst. For example, it is sometimes advantageous to prepare a polyol-synergistic combination mix prior to combining all of the ingredients in making the novel polyurethane foam products of this invention.

An organic polyol, including diols, and polyether, polyester, and polyesteramide polyols having hydrogen atoms that are reactive with isocyanates may be used in the practice of this invention. However, the use of polyester-polyols are preferred. Generally the polyols have molecular weights ranging from about 62 to about 5000 and have from 2 to about 8 or 10 or more hydroxyl groups per molecule, and from 0.5 to about 25 weight percent hydroxyl contents. Some have even higher hydroxyl content. They generally have hydroxyl numbers of from about 50 to as high as 500 or even 700. These materials are referred to conveniently as the "polyol" reactant.

Hydroxyl-bearing molecules which have been prepared by esterification type reactions from polyfunctional acids or anhydrides and polyfunctional alcohols may be used as the active hydrogen compounds in preparing polyurethane systems. These compounds are often called polyester-polyols. Typical acids used for making these polyester-polyols are adipic, maleic, phthalic, succinic, fumaric, tetrahydrophthalic, chlorendic and tetrachlorophthalic acids. Typical polyols are ethylene, propylene, butylene, diethylene and dipropylene glycols, and polyethylene, polypropylene glycols and glycerine, trimethylol propane, hexanetriol, pentaerythritol, sorbitol, and the like. Where available, the above-mentioned acids may be used in the anhydride form if desired.

In making the polyester-polyols, any of the various polyfunctional acids or anhydrides or mixtures thereof are caused to react with any of the glycols or polyols or mixtures thereof, using a stoichiometric excess of the hydroxyl groups such that the final polyol product contains predominantly hydroxyl end groups. The degree of hydroxyl functionality and the percent hydroxyl is easily varied to provide the desired polyols by technology and techniques which are known to those in the art. Some useful active hydrogen-containing polyols include the large family of adduct compounds which result when ethylene oxide, propylene oxide, 1,2- and 2,3-butylene oxide, or other alkylene oxides are added to such active hydrogen compounds as glycols and polyols represented by ethylene glycol, propylene glycol, glycerine, methyl glucoside, sucrose, sorbitol, hexanetriol, trimethylol propane, pentaerythritol as well as various alkylamines and alkylenediamines, and polyalkylenepolyamines, and the like. Various amounts of these alkylene oxides may be added to the base polyol or amine molecules referred to, depending upon the intended use of the polyurethane. For example, when a final polyurethane is desired which is flexible, one would use more alkylene oxide than for a more rigid polyurethane.

For example, a polyol for use in making flexible foams could be well represented by glycerine to which sufficient propylene oxide was added to give a final hydroxyl content of about 1.7%. Such a material would have a molecular weight of about 3000 and have a molar ratio of glycerine to propylene oxide of about 1 glycerine to 50 propylene oxide. This technique of controlling rigidity or flexibility by selection of the polyol molecule and the subsequent amount of alkylene oxide added is well known to those in the art. In addition to the glycols and the like which can serve as a base polyol molecule for addition of the alkylene oxides and thus yield the "polyol" molecule for reaction with the polyisocyanate, one can use a starting molecule which contains primary and/or secondary amine groups which have hydrogen reactive toward alkylene oxides. Here also, the quantity of alkylene oxide added depends upon the intended use of the final polyurethane products. Again, for flexible products where more alkylene oxide would be used to produce polyols with lower hydroxyl content, say, from about 0.1% to 5% or 10%, than for more rigid polyurethanes where polyols having weight percent hydroxyl content of from about 10% to 15% or 20%, typically 10% to 12%, are often used. Representative amines which may serve as active hydrogen-containing molecules for reaction with epoxides are those having from 1 to about 6 or more amino nitrogens, examples of which are ethylamine, ethylenediamine, diethylenetriamine, triethylenetetraamine, tetrapropylenepentamine and other linear saturated aliphatic alkylene amines, the important requirement being the presence of at least two, and preferably more, say 3 to 8 or 10 active hydrogen sites to which the alkylene oxide may be added.

Organic polyisocyanates are reacted with the polyols described above to prepare polyurethanes. Broadly, the term "polyisocyanate" as used herein, means any of the prior art polyisocyanates that have been or could be used to prepare polyurethanes. The term includes monomeric di- and polyisocyanates and prepolymers of polyols and polyisocyanates where the isocyanate groups are in excess so that there are free available isocyanate groups available to react with additional polyol. The organic polyisocyanates useful for the production of the polyurethanes include ethylene diisocyanate, ethylidene diisocyanate, propylene - 1,2 - diisocyanate, butylene-1,3-diisocyanate, hexylene - 1,6 - diisocyanate, cyclohexylene - 1,2-diisocyanate, and the aromatic polyisocyanates having from 2 to 3 isocyanate groups per molecule and from 1 to 3 phenylene rings as the only aromatic cyclic ring systems such as m-phenylene diisocyanate, 2,4 - toluene diisocyanate, 1,6-toluene diisocyanate, 3,3'-dimethyl- as well as various other polyisocyanates such as 4,4' - biphenylene diisocyanate, 3,3' - dimethoxy - 4,4' - biphenylene diisocyanate, 3,3' - diphenyl - 4,4' - biphenylene diisocyanate, 4,4'-biphenylene diisocyanate, 3,3'-dichloro-4,4'-biphenylene diisocyanate, triphenylmethane triisocyanate, 1,5 - naphthalene diisocyanate, and the like.

Useful catalyst, or initiator materials which may be used as the "catalyst" component include the tertiary amines either individually or in mixture like N-alkylmorpholines, such as N-ethylmorpholine, and N,N-dialkylcyclohexylamines, where the alkyl groups are methyl, ethyl, propyl, butyl, etc., also triethylamine, tripropylamine, tributylamine, triamylamine, pyridine, quinoline, dimethylpiperidine, dimethylhexahydroaniline, diethylhexahydroaniline, the reaction products of N,N'-diethylaminoethanol and phenyl isocyanate, esterimides, 1-methyl 4 - (dimethylaminoethyl) piperazine, N-ethylethylenimine, N,N,N',N' - tetramethyl - 1,3 - butanediamine, triethylamine, 2,4,6 - tri(dimethylaminomethyl) phenol, tetramethylguanidine, 2 - methylpyrazine, dimethylaniline, and nicotine; and metallic compounds including those of bismuth, lead, tin, titanium, iron antimony, uranium, cadmium, cobalt, thorium, aluminum, mercury, zinc, nickel, cerium, molybdenum, vanadium, copper, manganese, zirconium, etc. examples of which include bismuth nitrate, lead 2-ethylhexoate, lead benzoate, lead oleate, sodium trichlorophenate, sodium propionate, lithium acetate, potassium oleate, tetrabutyl tin, butyl tin trichlorate, stannic chloride, tributyl tin 1 - nonylphenate, stannous octoate, stannous oleate, dibutyl tin di(2-ethylhexoate), di(2-ethylhexyl) tin oxide, titanium tetrachloride, tetrabutyl titanate, ferric chloride, antimony trichloride, cadmium diethyl dithiophosphate, thorium nitrate, triphenylaluminum, nickelocene, etc. The catalyst component either as single compound or as a mixture may be used in conventional amounts, which usually ranges from about 0.05 to about 4 parts of catalyst per 100 parts of polyolisocyanate reactants by weight.

In the art and technology of producing polyurethanes, it is also known to employ what is called prepolymer techniques. This is a technique wherein part of the reaction involved in making a polyurethane is carried out yielding a prepolymer of increased molecular weight and with either resultant end groups of hydroxyls or isocyanates depending upon the stoichiometry used in making this prepolymer. This prepolymer is then used to prepare the desired final polyurethane product by reacting it with either a polyisocyanate or one of the desired polyols, depending, as has been mentioned above, on whether the terminal groups of the prepolymer are hydroxyls or isocyanates, respectively. The synergistic combination of this invention may also be used in the prepolymer technique of producing polyurethanes.

Polyurethanes are used in both the unfoamed and the so-called "foam" form. In general, a foamed polyurethane is formed when low boiling liquids, or normally gaseous blowing agents, or inflatants are generated by or incorporated into the polyurethane-forming reactants. Often the heat of reaction causes these low boiling liquid or gaseous blowing agents to volatilize, thus foaming the composition. In some cases the boiling point of the blowing agent is chosen to be well below room temperature, and the composition can be made to foam even before any substantial reaction between the polyol and the polyisocyanate reactants has occurred or before any heat is evolved. This technique is sometimes called frothing. Useful blowing agents, i.e., foam inducing agents, which may be added when foams are desired include water, either alone or admixed with other components, e.g., as an aqueous solution of a tertiary amine catalyst, and the chlorinated and fluorinated alkanes having from 1 to about 2 carbon atoms, such as the chlorofluoromethanes and chlorofluoroethanes, which are commercially available under various trademarks, such as "Freon" manufactured by E. I. du Pont.

When blowing or foaming agents are incorporated into the reactant composition, there may also be incorporated into the mixture various conventional foam stabilizers to control the amount and quality of the foamed polyurethane obtained. Used for this purpose are various surfactants including various silicone compounds and silicone oil mixtures, e.g., dimethyl-siloxame and alkylsilane-polyoxyalkylene glycol copolymers sold under various trade names, such as "Silicone L–520" manufactured by Union Carbide. For foaming or blowing polyurethane polymers there may be used from about 5 to 50 parts by weight of blowing agent and about 0.1 to 3 parts of the foam stabilizing agent per 100 parts by weight of the polyol and polyisocyanate reactants.

The flexible foamed polyurethanes obtained according to this invention may be used for air filters, fuel cells and sound attenuators for automobiles, aircraft, office and industrial equipment, interlining for apparel, applicators for cosmetics, soaps and lotions, kitchen products, dining comforts, furniture padding, rug underlay, dental products, disposable items, first-aid products, orthopedic and surgical products, decorative products and poromeric products.

Examples

To assist those skilled in the art to practice the present invention, the following procedures are suggested by way of illustration, parts and percentages being by weight unless otherwise specifically noted.

In order to more conveniently illustrate the foamable polyurethane-forming formulations used to carry out the present invention, the reactants are identified by their trademarks or a representative symbol. The trademarks are clearly defined hereinbelow. Fomrez–50 is a glycol-adipate type polyester. L–532 is an organosilicone surfactant. The expression "NEM" represents N-ethylmorpholine. The expression "TRN" represents N,N,N',N",N"-pentakis-2-hydroxypropyl-diethylenetriamine an aminopolyol as described by Formula II hereinabove. The expression "AMPP" represents an ammonium polyphosphate vended under the trademark Phoscheck P30 by Monsanto. The expression "MAMP" represents monoammonium phosphate. The expression "TDI" represents an 80:20 mixture of the 2,4- and 2,6-isomers of toluene diisocyanate. The expression "Index" is an art recognized term indicating the ratio of the actual amount of polyisocyanate in the reaction mixture to the theoretical amount of polyisocyanate needed for reaction with all active hydrogen compounds present in the reaction mixture, multiplied by 100.

I

The formulations listed below in Table I are foamed in a commercially available Hennecke continuous high pressure foam machine operating with a mixing head pressure of 15 p.s.i. at a mixer speed of 3000 r.p.m. using a three level mixing head equipped with a pin-type mixer. The main resin component and the non-burning imparting ingredient are charged into the mixing head at the upper level. The polyisocyanate and a portion of the catalyst system is charged into the mixing head at the middle level. The balance of the catalyst system, the surfactant system and, if desired, other low pressure additives are charged into the mixing head through the lower level. The foaming characteristics are a cream time (when the blowing gas comes out of the reaction mixture it produces a creamy opaque consistency) of about 3 seconds and a rise time of about 50 seconds. The compositions of the reaction mixtures are recited in Table I in parts per hundred, based on 100 parts by weight of polyol resin.

The foams described in Table I were evaluated for their nonburning, intumescent and flame-retardant properties by means of a high pressure open flame burnthrough test. In the test, foam samples (6" x 6" x 2") were directly contacted with an open high pressure flame from a commercially available National Blast Burner with type N.Z. tip operating at a pressure sufficient to produce approximately 5 inches of blue flame. The high pressure flame was maintained at 2 inches from the surface of the foam nearest the flame source until the high pressure flame burned through the opposite side of the foam test sample. In the test the flame burner head produces a flame of about 1800° F. and is placed vertically 2 inches above the horizontal surface of the foam test specimen so that the flame burned down through the 2-inch dimension of the foam sample. The time in minutes is measured from the initial high pressure flame contact with the foam sample until burnthrough. The average burnthrough times (average value based on 4 samples) in minutes are recorded in Table I.

TABLE I.—BURNTHROUGH TEST DATA

| Ingredients | Control | A | A1 | A2 | A3 | B | B1 | C | C1 | C2 | C3 | C4 | C5 | D | D1 | D2 | D3 | D4 |
|---|---|---|---|---|---|---|---|---|---|---|---|---|---|---|---|---|---|---|
| Fomrez 50 | 100 | 100 | 100 | 100 | 100 | 100 | 100 | 100 | 100 | 100 | 100 | 100 | 100 | 100 | 100 | 100 | 100 | 100 |
| TDI | 38.7 | 38.7 | 39.9 | 40.9 | 41.5 | 38.7 | 40.9 | 38.7 | 39.9 | 40.9 | 42.0 | 43.1 | 44.1 | 38.7 | 60.3 | 42.0 | 43.1 | 44.1 |
| Index | 100 | 100 | 100 | 100 | 100 | 100 | 100 | 100 | 100 | 100 | 100 | 100 | 100 | 100 | 100 | 100 | 100 | 100 |
| NEM | 1.0 | 1.8 | 1.5 | 1.0 | 1.0 | 2.2 | 1.2 | 3.5 | 2.0 | 1.5 | 1.0 | 1.0 | 0.4 | 3.0 | 1.0 | 2.0 | 1.5 | 1.5 |
| L532 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Water | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 |
| TRN | — | — | 1.0 | 2.0 | 2.5 | — | 2.0 | — | — | 1.0 | 2.0 | 3.0 | 4.0 | 5.0 | — | 20.0 | 3.0 | 4.0 |
| AMPP | — | 5.0 | 4.0 | 3.0 | 2.5 | 10.0 | 8.0 | 15.0 | 14.0 | 13.0 | 12.0 | 11.0 | 10.0 | 20.0 | — | 17.0 | 16.0 | 15.0 |
| Minutes for burnthrough | 0.5 | 0.5 | 0.5 | 0.5 | 0.6 | 0.7 | 1.2 | 0.8 | 1.4 | 1.6 | 1.7 | 3.7 | 1.9 | 0.7 | 0.4 | 1.6 | 5.9 | 3.1 |

It is to be understood that changes and variations may be made without departing from the spirit and scope of this invention as defined by the appended claims.

What is claimed is:

1. A nonburning, flexible, polyurethane foam produced by incorporating into the reactant mixture used to produce the polyurethane foam a nonburning imparting ingredient comprising at least 10 parts per hundred, based on 100 parts by weight of the polyol employed in the reactant mixture, of a mixture of at least 1 part by weight of (a) a nitrogen and phosphorus-containing compound selected from the group consisting of monoammonium phosphate, diammonium phosphate, ammonium polyphosphates, melamine phosphate, guanylurea phosphate and urea phosphate per part of (b) an N-alkylol substituted polyalkylene polyamine and allowing the resulting mixture to polymerize to a polyurethane.

2. A cellular material as defined in claim 1 wherein the ratio of (a) to (b) is from about 3:1 to about 6:1.

3. A cellular material as defined in claim 2 wherein component (a) is monoammonium phosphate.

4. A cellular material as defined in claim 2 wherein component (a) is a polyammonium phosphate.

5. A cellular material as defined in claim 4 wherein the polyammonium phosphate is of the formula:

$$H_{(n-m)+2}(NH_4)_m P_n O_{3n+1}$$

where $n$ is an integer greater than 10, $m$ is equal to $n+2$ and $m/n$ is between about 0.7 and 1.1.

6. A cellular material as defined in claim 2 wherein component (a) is diammonium phosphate.

7. A cellular material as defined in claim 1 wherein the N-alkylol substituted polyalkylene polyamine is of the formula:

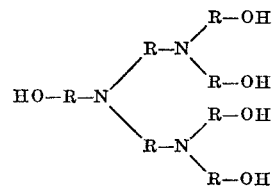

where R is alkylene.

8. A cellular material as defined in claim 1 wherein the

N-alkylol substituted polyalkylene polyamine is N,N,N', N',N''-pentakis-2-hydroxypropyl-diethylenetriamine.

References Cited

UNITED STATES PATENTS

| | | | |
|---|---|---|---|
| 3,134,742 | 5/1964 | Wismer et al. | 260—77.5 |
| 3,137,662 | 6/1964 | Recktenwald | 260—2.5 |
| 3,423,343 | 1/1969 | Barnett | 260—2.5 |
| 3,437,607 | 4/1969 | Nashu et al. | 260—2.5 |
| 3,455,850 | 7/1969 | Saunders | 260—2.5 |

FOREIGN PATENTS 705,937  3/1965  Canada  260—2.5

DONALD E. CZAJA, Primary Examiner
E. C. RZUCIDLO, Assistant Examiner

U.S. Cl. X.R.

260—2.5 AM, DIGEST 24